Nov. 16, 1954     M. IRELAND     2,694,766
THERMOSTAT CONSTRUCTION FOR SADIRONS
Filed Sept. 25, 1950
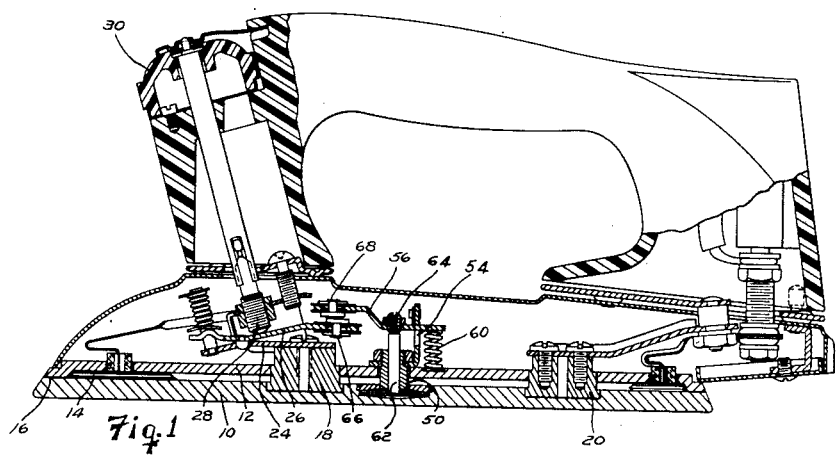
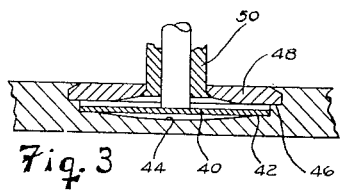
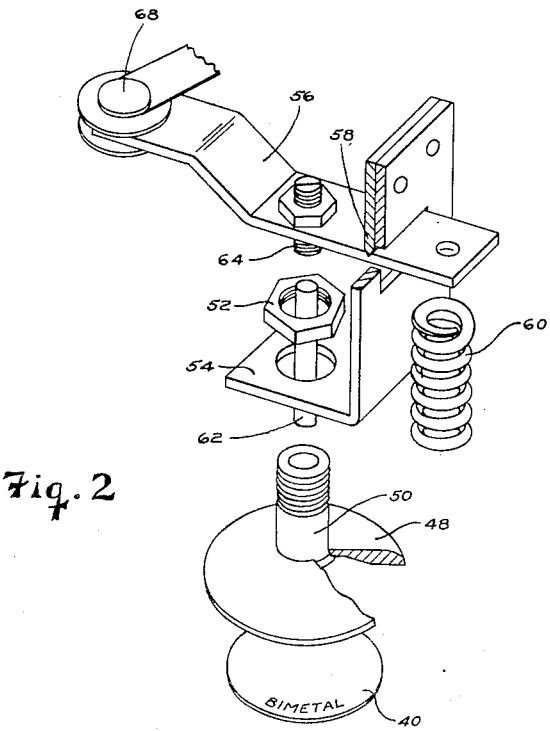
INVENTOR.
MURRAY IRELAND
BY
ATTORNEY

United States Patent Office 2,694,766
Patented Nov. 16, 1954

2,694,766

THERMOSTAT CONSTRUCTION FOR SADIRONS

Murray Ireland, Elgin, Ill., assignor to McGraw Electric Company, Elgin, Ill., a corporation of Delaware Application September 25, 1950, Serial No. 186,593

8 Claims. (Cl. 219—25)

The present invention relates to electric sadirons and to thermostatic controls therefor.

The working part of a sadiron is the smooth face of its sole plate, and the most important property of that face is its temperature. It is desirable that the temperature be held constant at each selected value and, to that end, that the thermostatic control be accurate, reliable and rugged. One difficulty that opposes this requirement is the further desirability that the mass and bulk of the iron be kept as low as possible and that therefore the thermostat be small and light. I have found that another difficulty arises from the frequent high temperatures and the rapid temperature changes to which a sadiron is subjected, and the consequent unpredictable dimensional changes in the iron that result from the relaxation of unavoidable manufacturing stresses in the metal.

Objects of the present invention include the provision of an improved thermostat that is simple and rugged, and also accurate and reliable in operation, the provision of such a thermostat that is small, compact and light, the provision of a sadiron thermostat which exhibits little or no response to dimensional changes of the iron, the provision of a thermostat that will remain accurate under all conditions of use of the iron, the provision of an improved, low-cost thermostat for an iron and the provision of an improved electric sadiron. These and other objects and advantages of the invention will appear from the following description of what I now consider the preferred embodiment thereof, and which, when taken in connection with the accompanying drawings, illustrates one manner in which the invention may be put into practice. In the drawings:

Figure 1 is a side elevational view, partly in section, showing an iron embodying by present invention, Fig. 2 is an exploded pictorial view of parts of the thermostat and switch structure of the iron of Fig. 1, and Fig. 3 is an enlarged view of a portion of Fig. 1.

In the iron shown in the drawings, a sole plate 10 and a pressure plate 12 enclose a heating element 14 and are held in firm, thermally-conducting contact by brazing around their entire outer edge, as for example at 16. Additional mechanical and thermal connection between the sole plate and pressure plate are provided by metal plugs 18 and 20 which are brazed into the sole plate 10 and staked to the pressure plate 12. These plugs 18 and 20 provide convenient fastening points for the shell and handle structure and, in addition, plug 18 supports part of the switch and adjusting mechanism for the thermal control. Thus a bracket 24 has pivoted thereon a contact arm 26, the position of which is controlled by adjusting screw 28. This screw in turn is controlled by a manual knob 30 mounted on the handle.

The thermostat includes a bimetal disc 40 which lies on a narrow annular shoulder 42 in a recess 44 in the top face of the sole plate 10. Supported on a second shoulder 46 in this same recess and overlying the bimetal 40 is a rigid cap 48 which is staked firm in the sole plate. Fixed to this cap is a bushing 50 which extends up through the heating element and the pressure plate 12. A nut 52 threaded onto bushing 50 clamps an angle bracket 54 against the pressure plate 12. Accordingly this construction holds the bracket 54 in a fixed, spaced relationship with the support 42 for the bimetal 40. A switch arm 56 rocks on a knife edge 58 carried by the bracket 54 (see Fig. 2) and is urged in a counter-clockwise direction, as seen in Fig. 1, by spring 60. A pin 62 sliding in the bushing 50 provides a driving connection between the bimetal disc 40 and an adjustable abutment screw 64 on the switch arm 56. Cooperating contacts 66 and 68, carried by the switch arms 26 and 56 respectively, control the flow of current to the electric heater 14 for thereby controlling the temperature of the iron.

The bimetal 40 is arranged with its high expansion side uppermost so that in operation its center portion bulges up in response to a rise of temperature. This motion raises the pin 62 against the abutment screw 64 and rotates the switch arm 56 in opposition to the spring 60 for lifting contact 68 off of contact 66 for breaking the circuit. The temperature at which the circuit opens is determined in part by the position of switch arm 26, which in turn is controlled by the setting of the adjusting knob 30. The adjustable abutment screw 64 provides a compensation for dimensional variations in manufacture, as for example, variations in the spacing between the sole plate 10 and pressure plate 12.

Accordingly, the motion of flexure of the bimetal 40 is transformed into up-and-down motion of the pin 62 relative to the knife edge 58. The rigid, direct connections between the portion of sole plate 10 that supports the bimetal and the bracket 54 insures that no warping or change in the sole plate can contribute to this relative motion. It is particularly important to exclude any extraneous contributions from the motion at this point because this motion is rather slight and consequently even slight disturbances would introduce objectionably large errors. Although the relative position of contacts 66 and 68 could be influenced to some extent by dimensional changes of the sole plate structure, as for example by bending of the portion between the bimetal cavity 44 and the metal plug 18, the lever 56 reduces the effect of any such disturbance. The motion of contact 68 constitutes a sufficient magnification of the motion of bimetal 40 that such disturbances of the position of contact 66 are small in relation to the motion of contact 68.

The invention is capable of modifications and variations within the scope of the claims.

I claim:

1. In an automatic electric sadiron, a sole plate, an electric heater therefor, a plate of thermostatic bimetal for responding to the temperature of said sole plate and having supporting bearing thereon, a rigid support fastened rigidly to said sole plate next to the bearing for said bimetal, an electric switch for controlling said heater comprising a contact-operating lever fastened to and supported on said rigid support, and a driving connection between said bimetal and said contact-operating lever.

2. In an automatic electric sadiron, a sole plate, an electric heater therefor, a plate of thermostatic bimetal for responding to the temperature of said sole plate, said bimetal lying on said sole plate and engaging it only at the edges of said bimetal, a rigid support member fastened to said sole plate next to the engaged edges of said bimetal, an electric switch for controlling said heater comprising a contact-operating mechanism supported on and located by said rigid support member, and a driving connection between said bimetal and said contact-operating mechanism.

3. In an automatic electric sadiron, in combination, a sole plate, an electric heater therefor, a thermostatic bimetal plate on siad sole plate, responsive to the temperature thereof, said bimetal and sole plate being in engagement only at the edges of said bimetal, a rigid cap over said bimetal fastened firm to said sole plate next to the edges of said bimetal, a bushing fastened to said cap and extending therefrom, an electric switch for controlling said heater including a movable contact-operating member, means for supporting said contact-operating member, said means being fastened to said bushing and held thereby in substantially fixed position relative to said sole plate, and a rod in said bushing, guided thereby for transmitting motion from said bimetal to said contact-operating member.

4. In an automatic electric sadiron, in combination, a sole plate having a recess therein, a thermostatic bimetal plate in said recess, engaging the plate only at the edges of said bimetal, and responsive to the temperature of said sole plate, a rigid cap in said recess overlying said bimetal, fastened therein firm to said sole plate, an electric heating element on said sole plate, and in part overlying said recess and cap, a top plate over said heating element, said top plate and sole plate being fastened together at least at their marginal edges for clamping said heating element between them, a bushing fastened firm to said cap and extending therefrom up through said heating element and top plate, a switch for controlling said heating element including a motion-magnifying, contact-operating lever, support means for said lever, said means being fastened to said bushing and held thereby in a substantially fixed position relative to said sole plate, and a push rod extending through said bushing and guided thereby for transmitting motion from said bimetal to said lever.

5. In combination in a construction for an automatic electric sadiron, a sole plate, a thermostatic bimetal plate thereon responsive to the temperature thereof, a cap fastened to said sole plate next to the edge of said bimetal and overlying said bimetal, a top plate overlying said sole plate, an electric heating element between said sole plate and top plate, a bushing fastened to said cap and extending up through said heating element and top plate, clamping means engaging said bushing and bearing against said top plate for thereby clamping said top plate against said heating element and sole plate, and a rod extending through said bushing actuated by said bimetal.

6. In an automatic sadiron, a sole plate, a heater therefor, a round thermostatic bimetal plate lying on said sole plate for responding to the temperature of said sole plate, said bimetal engaging said sole plate only at the edges of said bimetal, a rigid cap over said bimetal fastened rigidly to said sole plate next the edge of said bimetal, a rigid strut fastened rigidly on said cap, control apparatus for said heater including a movable lever supported on said strut, and a driving connection between said bimetal and said lever.

7. In an automatic sadiron, a sole plate having a round, shouldered recess in its upper face, a round, thermostatic, bimetal plate for responding to the temperature of said sole plate, said bimetal lying in said recess and engaging said sole plate only at the edges of said bimetal, said edges lying just within and below the shoulder of said recess, a rigid cap overlying said bimetal, setting on said shoulder and there fastened firm and rigid in said recess, a rigid strut firm on said cap, a heater for said sole plate, control apparatus for controlling the operation of said heater including a movable member supported on said strut, and an operating connection between said bimetal and said movable member.

8. In an automatic sadiron, a sole plate, a heater therefor, a round bimetal plate on said sole plate engaging said sole plate only at the edges of said bimetal for responding to the temperature of said sole plate, a rigid cap over said bimetal having firm support on said sole plate next the edge of said bimetal, a rigid strut firm on said cap, control apparatus for controlling the operation of said heater, including a motion-magnifying lever supported on said strut, an operating connection between said bimetal and said lever, a first electric contact moved by said motion-magnifying lever through a greater distance than the deflection of said bimetal, and a second electric contact supported independently of said strut and cooperating with said first contact.

References Cited in the file of this patent

UNITED STATES PATENTS

| Number | Name | Date |
| --- | --- | --- |
| 1,845,997 | Spencer | Feb. 16, 1932 |
| 2,520,774 | Osterheld | Aug. 29, 1950 |
| 2,585,928 | Gomersall et al. | Feb. 19, 1952 |

FOREIGN PATENTS

| Number | Country | Date |
| --- | --- | --- |
| 600,050 | Great Britain | Mar. 30, 1948 |